United States Patent
Wang et al.

(10) Patent No.: US 11,256,518 B2
(45) Date of Patent: Feb. 22, 2022

(54) DATAPATH CIRCUITRY FOR MATH OPERATIONS USING SIMD PIPELINES

(71) Applicant: Apple Inc., Cupertino, CA (US)

(72) Inventors: Liang-Kai Wang, Austin, TX (US); Robert D. Kenney, Austin, TX (US); Terence M. Potter, Austin, TX (US); Vinod Reddy Nalamalapu, Austin, TX (US); Sivayya V. Ayinala, Austin, TX (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 16/597,625

(22) Filed: Oct. 9, 2019

(65) Prior Publication Data
US 2021/0109761 A1    Apr. 15, 2021

(51) Int. Cl.
  *G06F 9/30* (2018.01)
  *G06F 9/54* (2006.01)
  *G06F 9/38* (2018.01)
  *G06F 17/16* (2006.01)

(52) U.S. Cl.
  CPC ........ *G06F 9/3887* (2013.01); *G06F 9/30014* (2013.01); *G06F 17/16* (2013.01)

(58) Field of Classification Search
  None
  See application file for complete search history.

(56) References Cited

U.S. PATENT DOCUMENTS

| | | | |
|---|---|---|---|
| 8,074,051 B2 | 12/2011 | Hokenek et al. |
| 8,248,422 B2 | 8/2012 | Mejdrich et al. |
| 9,304,775 B1 | 4/2016 | Lindholm et al. |
| 9,389,869 B2 | 7/2016 | Tran |
| 9,519,944 B2 | 12/2016 | Goodman et al. |
| 9,600,288 B1 | 3/2017 | Potter et al. |
| 9,672,043 B2 | 6/2017 | Eisen et al. |
| 9,830,156 B2 | 11/2017 | Krashinsky |
| 10,061,591 B2 | 8/2018 | Beylin et al. |
| 10,261,835 B2 | 4/2019 | Joao et al. |
| 10,296,333 B2 | 5/2019 | Rubinstein et al. |
| 10,459,723 B2 | 10/2019 | Mahurin |

(Continued)

*Primary Examiner* — Hyun Nam
(74) *Attorney, Agent, or Firm* — Kowert, Hood, Munyon, Rankin & Goetzel, P.C.

(57) ABSTRACT

Techniques are disclosed relating to sharing operands among SIMD threads for a larger arithmetic operation. In some embodiments, a set of multiple hardware pipelines is configured to execute single-instruction multiple-data (SIMD) instructions for multiple threads in parallel, where ones of the hardware pipelines include execution circuitry configured to perform floating-point operations using one or more pipeline stages of the pipeline and first routing circuitry configured to select, from among thread-specific operands stored for the hardware pipeline and from one or more other pipelines in the set, a first input operand for an operation by the execution circuitry. In some embodiments, a device is configured to perform a mathematical operation on source input data structures stored across thread-specific storage for the set of hardware pipelines, by executing multiple SIMD floating-point operations using the execution circuitry and the first routing circuitry. This may improve performance and reduce power consumption for matrix multiply and reduction operations, for example.

20 Claims, 16 Drawing Sheets

(56) References Cited

U.S. PATENT DOCUMENTS

| | | |
|---|---|---|
| 2005/0286633 A1 | 12/2005 | Abel et al. |
| 2006/0179274 A1* | 8/2006 | Jones .................... G06F 9/3802 |
| | | 712/205 |
| 2006/0179283 A1* | 8/2006 | Jensen ................ G06F 9/30079 |
| | | 712/218 |
| 2006/0179439 A1* | 8/2006 | Jones .................... G06F 9/4881 |
| | | 718/105 |
| 2008/0263552 A1* | 4/2008 | Takagi ...................... G06F 9/52 |
| 2008/0148009 A1* | 6/2008 | Doerr ...................... G06F 15/80 |
| | | 712/11 |
| 2009/0063608 A1 | 3/2009 | Mejdrich et al. |
| 2009/0254736 A1 | 10/2009 | Symes et al. |
| 2012/0079503 A1 | 3/2012 | Dally et al. |
| 2013/0339649 A1 | 12/2013 | Hsu et al. |
| 2014/0122551 A1 | 5/2014 | Dogon et al. |
| 2015/0089202 A1* | 3/2015 | Qiu et al. .................. G06F 9/38 |
| | | 712/218 |
| 2018/0018299 A1 | 1/2018 | Han et al. |
| 2018/0203701 A1* | 1/2018 | Nield et al. ................ G06F 9/30 |
| 2018/0089090 A1 | 3/2018 | Havlir et al. |
| 2018/0217844 A1 | 8/2018 | Kalamatianos et al. |
| 2019/0004807 A1 | 1/2019 | Chen et al. |
| 2019/0004814 A1 | 1/2019 | Chen et al. |
| 2019/0108068 A1* | 4/2019 | Britkin et al. ............ G06F 9/50 |
| 2019/0132603 A1* | 5/2019 | Surti ...................... G06T 15/503 |
| 2019/0139182 A1* | 5/2019 | Nurvitadhi ........... G06N 3/0445 |
| 2019/0199370 A1 | 6/2019 | Madduri et al. |

* cited by examiner

| (0,0) | (0,1) | (0,2) | (0,3) | (0,4) | (0,5) | (0,6) | (0,7) |
|-------|-------|-------|-------|-------|-------|-------|-------|
| (1,0) | (1,1) | (1,2) | (1,3) | (1,4) | (1,5) | (1,6) | (1,7) |
| (2,0) | (2,1) | (2,2) | (2,3) | (2,4) | (2,5) | (2,6) | (2,7) |
| (3,0) | (3,1) | (3,2) | (3,3) | (3,4) | (3,5) | (3,6) | (3,7) |
| (4,0) | (4,1) | (4,2) | (4,3) | (4,4) | (4,5) | (4,6) | (4,7) |
| (5,0) | (5,1) | (5,2) | (5,3) | (5,4) | (5,5) | (5,6) | (5,7) |
| (6,0) | (6,1) | (6,2) | (6,3) | (6,4) | (6,5) | (6,6) | (6,7) |
| (7,0) | (7,1) | (7,2) | (7,3) | (7,4) | (7,5) | (7,6) | (7,7) |

| Cycle | Lane 0, generates R00, R01 | | Lane 1, generates R02, R03 | | Lane 2, generates R10, R11 | | Lane 3, generates R12, R13 | | Lane 4, generates R20, R21 | | Lane 5, generates R22, R23 | | Lane 6, generates R30, R31 | | Lane 7, generates R32, R33 | |
|---|---|---|---|---|---|---|---|---|---|---|---|---|---|---|---|---|
| 0 | A00 | B00 | A00 | B02 | A10 | B00 | A10 | B02 | A20 | B00 | A20 | B02 | A30 | B00 | A30 | B02 |
| 1 | A00 | B01 | A00 | B03 | A10 | B01 | A10 | B03 | A20 | B01 | A20 | B03 | A30 | B01 | A30 | B03 |
| 2 | A01 | B10 | A01 | B12 | A11 | B10 | A11 | B12 | A21 | B10 | A21 | B12 | A31 | B10 | A31 | B12 |
| 3 | A01 | B11 | A01 | B13 | A11 | B11 | A11 | B13 | A21 | B11 | A21 | B13 | A31 | B11 | A31 | B13 |
| 4 | A02 | B20 | A02 | B22 | A12 | B20 | A12 | B22 | A22 | B20 | A22 | B22 | A32 | B20 | A32 | B22 |
| 5 | A02 | B21 | A02 | B23 | A12 | B21 | A12 | B23 | A22 | B21 | A22 | B23 | A32 | B21 | A32 | B23 |
| 6 | A03 | B30 | A03 | B32 | A13 | B30 | A13 | B32 | A23 | B30 | A23 | B32 | A33 | B30 | A33 | B32 |
| 7 | A03 | B31 | A03 | B33 | A13 | B31 | A13 | B33 | A23 | B31 | A23 | B33 | A33 | B31 | A33 | B33 |
| 8 | A04 | B40 | A04 | B42 | A14 | B40 | A14 | B42 | A24 | B40 | A24 | B42 | A34 | B40 | A34 | B42 |
| 9 | A04 | B41 | A04 | B43 | A14 | B41 | A14 | B43 | A24 | B41 | A24 | B43 | A34 | B41 | A34 | B43 |
| 10 | A05 | B50 | A05 | B52 | A15 | B50 | A15 | B52 | A25 | B50 | A25 | B52 | A35 | B50 | A35 | B52 |
| 11 | A05 | B51 | A05 | B53 | A15 | B51 | A15 | B53 | A25 | B51 | A25 | B53 | A35 | B51 | A35 | B53 |
| 12 | A06 | B60 | A06 | B62 | A16 | B60 | A16 | B62 | A26 | B60 | A26 | B62 | A36 | B60 | A36 | B62 |
| 13 | A06 | B61 | A06 | B63 | A16 | B61 | A16 | B63 | A26 | B61 | A26 | B63 | A36 | B61 | A36 | B63 |
| 14 | A07 | B70 | A07 | B72 | A17 | B70 | A17 | B72 | A27 | B70 | A27 | B72 | A37 | B70 | A37 | B72 |
| 15 | A07 | B71 | A07 | B73 | A17 | B71 | A17 | B73 | A27 | B71 | A27 | B73 | A37 | B71 | A37 | B73 |

FIG. 5A

| Lane 8, generates R04, R05 | Lane 9, generates R06, R07 | Lane 10, generates R14, R15 | Lane 11, generates R16, R17 | Lane 12, generates R24, R25 | Lane 13, generates R26, R27 | Lane 14, generates R34, R35 | Lane 15, generates R36, R37 |
|---|---|---|---|---|---|---|---|
| A00 B04 | A00 B06 | A10 B04 | A10 B06 | A20 B04 | A20 B06 | A30 B04 | A30 B06 |
| A00 B05 | A00 B07 | A10 B05 | A10 B07 | A20 B05 | A20 B07 | A30 B05 | A30 B07 |
| A01 B14 | A01 B16 | A11 B14 | A11 B16 | A21 B14 | A21 B16 | A31 B14 | A31 B16 |
| A01 B15 | A01 B17 | A11 B15 | A11 B17 | A21 B15 | A21 B17 | A31 B15 | A31 B17 |
| A02 B24 | A02 B26 | A12 B24 | A12 B26 | A22 B24 | A22 B26 | A32 B24 | A32 B26 |
| A02 B25 | A02 B27 | A12 B25 | A12 B27 | A22 B25 | A22 B27 | A32 B25 | A32 B27 |
| A03 B34 | A03 B36 | A13 B34 | A13 B36 | A23 B34 | A23 B36 | A33 B34 | A33 B36 |
| A03 B35 | A03 B37 | A13 B35 | A13 B37 | A23 B35 | A23 B37 | A33 B35 | A33 B37 |
| A04 B44 | A04 B46 | A14 B44 | A14 B46 | A24 B44 | A24 B46 | A34 B44 | A34 B46 |
| A04 B45 | A04 B47 | A14 B45 | A14 B47 | A24 B45 | A24 B47 | A34 B45 | A34 B47 |
| A05 B54 | A05 B56 | A15 B54 | A15 B56 | A25 B54 | A25 B56 | A35 B54 | A35 B56 |
| A05 B55 | A05 B57 | A15 B55 | A15 B57 | A25 B55 | A25 B57 | A35 B55 | A35 B57 |
| A06 B64 | A06 B66 | A16 B64 | A16 B66 | A26 B64 | A26 B66 | A36 B64 | A36 B66 |
| A06 B65 | A06 B67 | A16 B65 | A16 B67 | A26 B65 | A26 B67 | A36 B65 | A36 B67 |
| A07 B74 | A07 B76 | A17 B74 | A17 B76 | A27 B74 | A27 B76 | A37 B74 | A37 B76 |
| A07 B75 | A07 B77 | A17 B75 | A17 B77 | A27 B75 | A27 B77 | A37 B75 | A37 B77 |

FIG. 5B

| | Lane 16, generates R40, R41 | | Lane 17, generates R42, R43 | | Lane 18, generates R50, R51 | | Lane 19, generates R52, R53 | | Lane 20, generates R60, R61 | | Lane 21, generates R62, R63 | | Lane 22, generates R70, R71 | | Lane 23, generates R72, R73 | |
|---|---|---|---|---|---|---|---|---|---|---|---|---|---|---|---|---|
| 0 | | | | | | | | | | | | | | | | |
| 1 | A40 | B00 | A40 | B02 | A50 | B00 | A50 | B02 | A60 | B00 | A60 | B02 | A70 | B00 | A70 | B02 |
| 2 | A40 | B01 | A40 | B03 | A50 | B01 | A50 | B03 | A60 | B01 | A60 | B03 | A70 | B01 | A70 | B03 |
| 3 | A41 | B10 | A41 | B12 | A51 | B10 | A51 | B12 | A61 | B10 | A61 | B12 | A71 | B10 | A71 | B12 |
| 4 | A41 | B11 | A41 | B13 | A51 | B11 | A51 | B13 | A61 | B11 | A61 | B13 | A71 | B11 | A71 | B13 |
| 5 | A42 | B20 | A42 | B22 | A52 | B20 | A52 | B22 | A62 | B20 | A62 | B22 | A72 | B20 | A72 | B22 |
| 6 | A42 | B21 | A42 | B23 | A52 | B21 | A52 | B23 | A62 | B21 | A62 | B23 | A72 | B21 | A72 | B23 |
| 7 | A43 | B30 | A43 | B32 | A53 | B30 | A53 | B32 | A63 | B30 | A63 | B32 | A73 | B30 | A73 | B32 |
| 8 | A43 | B31 | A43 | B33 | A53 | B31 | A53 | B33 | A63 | B31 | A63 | B33 | A73 | B31 | A73 | B33 |
| 9 | A44 | B40 | A44 | B42 | A54 | B40 | A54 | B42 | A64 | B40 | A64 | B42 | A74 | B40 | A74 | B42 |
| 10 | A44 | B41 | A44 | B43 | A54 | B41 | A54 | B43 | A64 | B41 | A64 | B43 | A74 | B41 | A74 | B43 |
| 11 | A45 | B50 | A45 | B52 | A55 | B50 | A55 | B52 | A65 | B50 | A65 | B52 | A75 | B50 | A75 | B52 |
| 12 | A45 | B51 | A45 | B53 | A55 | B51 | A55 | B53 | A65 | B51 | A65 | B53 | A75 | B51 | A75 | B53 |
| 13 | A46 | B60 | A46 | B62 | A56 | B60 | A56 | B62 | A66 | B60 | A66 | B62 | A76 | B60 | A76 | B62 |
| 14 | A46 | B61 | A46 | B63 | A56 | B61 | A56 | B63 | A66 | B61 | A66 | B63 | A76 | B61 | A76 | B63 |
| 15 | A47 | B70 | A47 | B72 | A57 | B70 | A57 | B72 | A67 | B70 | A67 | B72 | A77 | B70 | A77 | B72 |
| 16 | A47 | B71 | A47 | B73 | A57 | B71 | A57 | B73 | A67 | B71 | A67 | B73 | A77 | B71 | A77 | B73 |

Perform a mathematical operation on source input data structures stored across thread-specific storage for a set of hardware pipelines, by executing multiple SIMD floating-point operations, including, for multiple SIMD instructions:
710

Perform floating-point operations using one or more pipeline stages of one of the pipelines
720

Select from among thread-specific operands stored for the hardware pipeline and from one or more other pipelines in the set, a first input operand for an operation by the execution circuitry
730

FIG. 7

DATAPATH CIRCUITRY FOR MATH OPERATIONS USING SIMD PIPELINES

BACKGROUND

Technical Field

This disclosure relates generally to processor architecture and more particularly to circuitry configured to perform math operations such as matrix multiplication using operand routing among single-instruction multiple-data (SIMD) pipelines.

Description of the Related Art

Many processors execute instructions using SIMD architectures (which may also be referred to as single instruction multiple thread (SIMT) architectures) in which a given operation is specified for a set of multiple threads that perform the operation on potentially different input data. Traditionally, private thread data was not shared among threads in SIMD architectures, e.g., each thread operates on its private operands and does not share data with other threads. Various computing algorithms may utilize matrix multiplication or SIMD reduce operations that use substantial amounts of processing resources in traditional SIMD implementations.

BRIEF DESCRIPTION OF THE DRAWINGS

FIG. 3 is a diagram illustrating example indices of entries in an 8×8 matrix data structure, according to some embodiments.

FIG. 4 is a diagram illustrating example storage of an 8×8 matrix data structure across thread-specific registers for a SIMD group with thirty-two threads, according to some embodiments.

FIGS. 5A-5D are diagrams illustrating example input operands for micro-operations performed by different SIMD pipelines in different cycles in order to implement matrix multiplication, according to some embodiments.

FIG. 7 is a flow diagram illustrating another example method for using routing among SIMD pipelines to perform a math operation on input data structures stored across thread-specific storage for the pipelines, according to some embodiments.

Figure 1A:
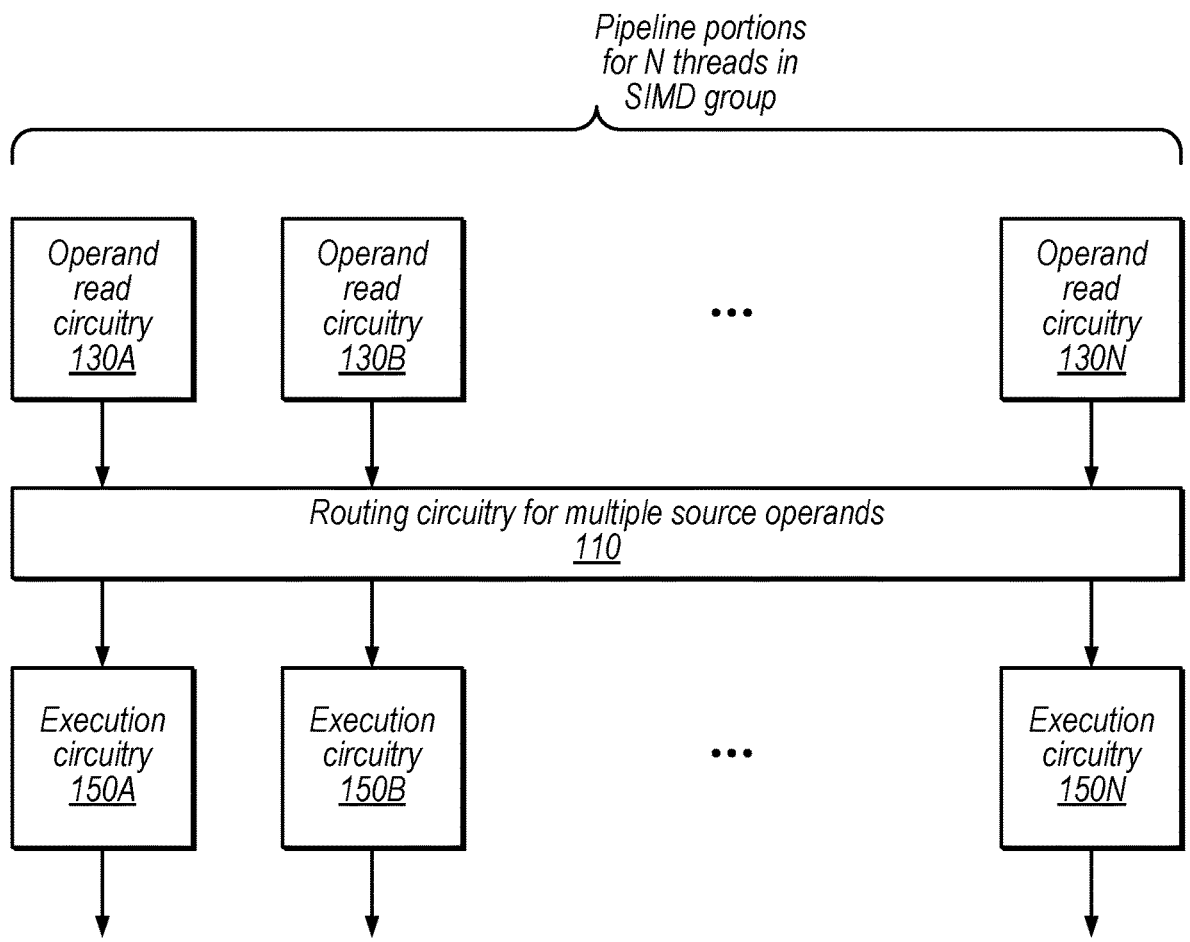
FIG. 1A is a block diagram illustrating example pipeline portions for threads of a SIMD group, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "multiplexer configured to select an value to output from among multiple inputs" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Overview of Operations on Data Structures Stored Across SIMD Pipelines

Various types of computer processors may include sets of pipelines configured to execute SIMD instructions in parallel. For example, graphics processors often include programmable shader cores that are configured to execute instructions for a set of related threads in a SIMD fashion. In some embodiments, each thread is assigned to a hardware pipeline that fetches operands for that thread and performs the specified operations in parallel with other pipelines for the set of threads. The group of threads may be referred to as a SIMD group, a wavefront, a clique, or a warp, for example. Note that, in some embodiments, a larger set of threads in a thread group may be split into multiple SIMD groups. Each thread in the thread group may execute the same program, and threads in the same SIMD group may share a program counter while executing that program. Processors may have a large number of shader pipelines such that multiple separate SIMD groups may also execute in parallel. In some embodiments, each thread has private operand storage, e.g., in a register file. Thus, a read of a particular register from the register file may provide the version of the register for each thread in a SIMD group.

In some embodiments, one or more input data structures are stored across thread-specific storage for a number of pipelines, e.g., to which a SIMD group has been assigned. For example, a first portion of a data structure may be stored in thread-specific registers of a first thread, a second portion of the data structure may be stored in thread-specific registers of a second thread, and so on. In some embodiments, routing circuitry among the pipelines may facilitate performance of an operation on the input data structure(s), e.g., a matrix multiplication or a SIMD reduction.

FIG. 1A is a block diagram illustrating example pipeline portions, according to some embodiments. In the illustrated embodiment, each pipeline includes operand read circuitry 130 and execution circuitry 150. Operand read circuitry 130 may be configured to access operands in thread-specific storage for each thread. Execution circuitry 150 may include circuitry configured to perform floating-point operations, for example.

In the illustrated embodiment, the system also includes routing circuitry 110 for multiple source operands. For certain instructions, in this embodiment, the routing circuitry 110 is configured to route at least two operands (e.g., two multiplicands for a fused multiply-add instruction) from one or more source pipelines to a target pipeline for processing by execution circuitry 150. In various embodiments, this may facilitate complex operations on input data structure(s) by sharing intermediate results among pipelines for different threads over multiple micro-operations performed by the execution circuitry 150.

Figure 1B:
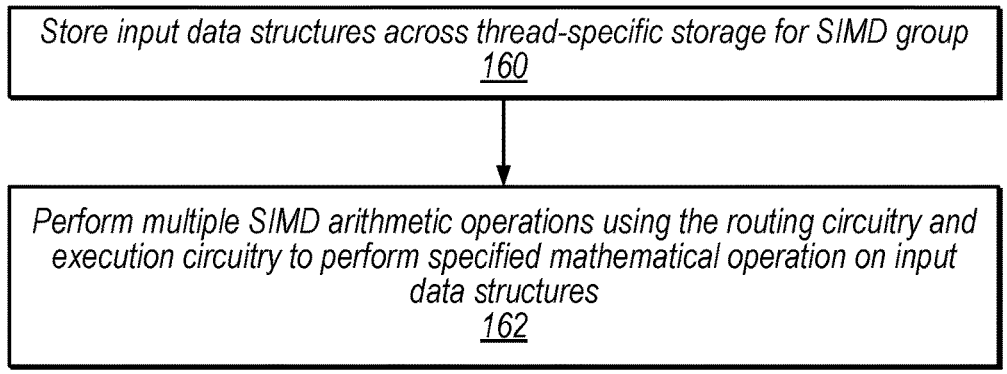
FIG. 1B is a flow diagram illustrating an example method for using routing circuitry to perform a mathematical operation on input data structures stored across thread-specific storage for a SIMD group, according to some embodiments.

FIG. 1B is a flow diagram illustrating an example method for using routing circuitry to perform a mathematical operation on input data structures stored across thread-specific storage for a SIMD group, according to some embodiments.

At 160, in the illustrated embodiment, a computing device stores input data structure across thread-specific storage for a SIMD group. This may include storing the data in one or more registers for the SIMD group, as discussed below with reference to FIG. 4. In other embodiments, the data structures may be stored in other types of thread-specific storage, such as an operand cache, a region of random access memory, etc. Note that, in some embodiments or situations, the data structures may be stored using thread-specific storage for only a portion of the threads in a SIMD group, e.g., for operations on smaller input data structures.

At 162, in the illustrated embodiment, the device performs multiple SIMD arithmetic operations (e.g., fused multiply-add operations) using the routing circuitry and execution circuitry to perform the specified mathematical operation on input data structures. For example, as discussed in detail below, in some embodiments the device is configured to execute sixteen SIMD micro-operations to perform an 8×8 matrix multiply.

Example Pipeline with Routing Circuitry for Multiple Input Operands

Figure 2:
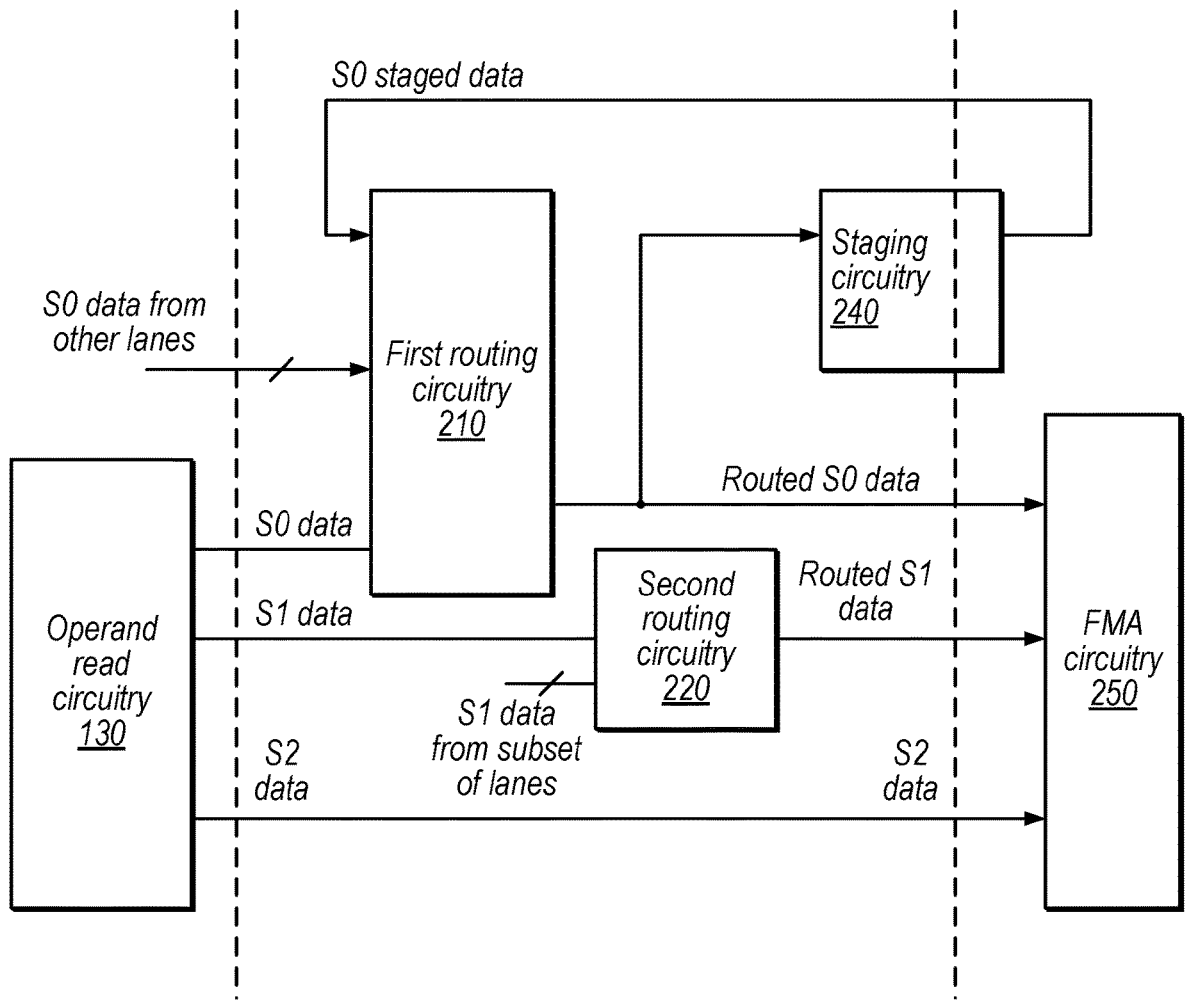
FIG. 2 is a block diagram illustrating an example pipeline with multiple sets of routing circuitry with different capabilities, according to some embodiments.

FIG. 2 is a block diagram illustrating an example pipeline with multiple sets of routing circuitry with different capabilities, according to some embodiments. In the illustrated embodiment, the pipeline includes operand read circuitry 130, first routing circuitry 210, second routing circuitry 220, staging circuitry 240, and fused multiple-add (FMA) circuitry 250. In some embodiments, a device include multiple such pipelines for different threads in a SIMD group to perform SIMD operations for the threads in parallel.

Operand read circuitry 130 may be configured as described above with reference to FIGS. 1A and 1s configured to provide data for three input operands S0, S1, and S2, in the illustrated embodiment.

First routing circuitry 210, in the illustrated embodiment, is configured to select from among S0 data from operand read circuitry 130 (which is for the thread assigned to the illustrated pipeline) and S0 data from other pipelines (which may also be referred to as SIMD lanes). First routing circuitry 210 then provides the selected S0 operand data to FMA circuitry 250 and to staging circuitry 240 for potential storage. In the illustrated embodiment, first routing circuitry 210 may also select an S0 input from staging circuitry 240, which may store operand(s) from a previous micro-operation executed by the pipeline. Staging circuitry 240 may be used to store values of matrix elements during micro-operation expansion even when not all threads of a micro-operation are executed in the same cycle, e.g., as in the examples of FIGS. 5A-5D below. Staging circuitry 240 may be dedicated circuitry or an operand cache at a lower level than the register file, in some embodiments. In embodiments without staging circuitry, a register file may be used for staging operations. Staging is discussed in further detail below. In some embodiments, first routing circuitry 210 is configured to select from among S0 data from all threads in the SIMD group. For example, first routing circuitry 210 may be a full crossbar, or a multi-level routing circuit as described below with reference to FIGS. 8A-9.

Second routing circuitry 220, in the illustrated embodiment, is configured to select from among S1 data from operand read circuitry 130 and S1 data from a subset of other threads in the SIMD group. For example, in some embodiments, second routing circuitry is configured to select from among S1 inputs from four threads. In some embodiments, the threads are the thread assigned to the illustrated pipeline (where X refers to the index of this thread in the SIMD group), the thread assigned to pipeline X+1, the thread assigned to pipeline X+8, and the thread assigned to pipeline X+9. The subset of threads may vary, however, in other embodiments. Using a smaller routing network for one of the operands than the other may reduce area and power consumption while facilitating disclosed mathematical operations over multiple cycles.

Note that, in some embodiments, first routing circuitry 210 or second routing circuitry 220 may be configured to separately route portions of a register, e.g., sending an upper portion to a first thread and a lower portion to a second, different thread. This may improve performance or reduce power consumption for 16-bit modes of operation, for example.

FMA circuitry 250, in the illustrated embodiment, is configured to receive an S2 operand from operand read circuitry and routed S0 and S1 operands from routing circuitry 210 and 220 and perform an operation to generate an output operand. For example, FMA circuitry 250 may generate a result operand for the operation S0*S1+S2. FMA circuitry 250 is one example of a floating-point execution unit, but disclosed techniques may be used with various types of execution units and various data formats (e.g., integer, fixed point, floating point, etc.). In some embodiments, FMA circuitry 250 is configured to perform multiple fused multiply-add operations as part of a matrix multiply operation.

Example Matrix Multiplication

FIG. 3 is a diagram illustrating an example 8×8 matrix. In the illustrated embodiment, entries in the matrix are indicated using column and row indices. For example, the upper left entry is entry (0,0) while the lower right entry is entry (7,7). Generally, the notation "Axy" may be used herein to denote an entry in matrix A at row x and column y. In some embodiments, the device is configured to multiply a matrix A by a matrix B and add a matrix C to the result.

Note that the disclosed techniques may be used with matrices or other data structures of various sizes. The specific data structures and operations disclosed herein are included for purposes of illustration but are not intended to limit the scope of the present disclosure.

Figure 4:
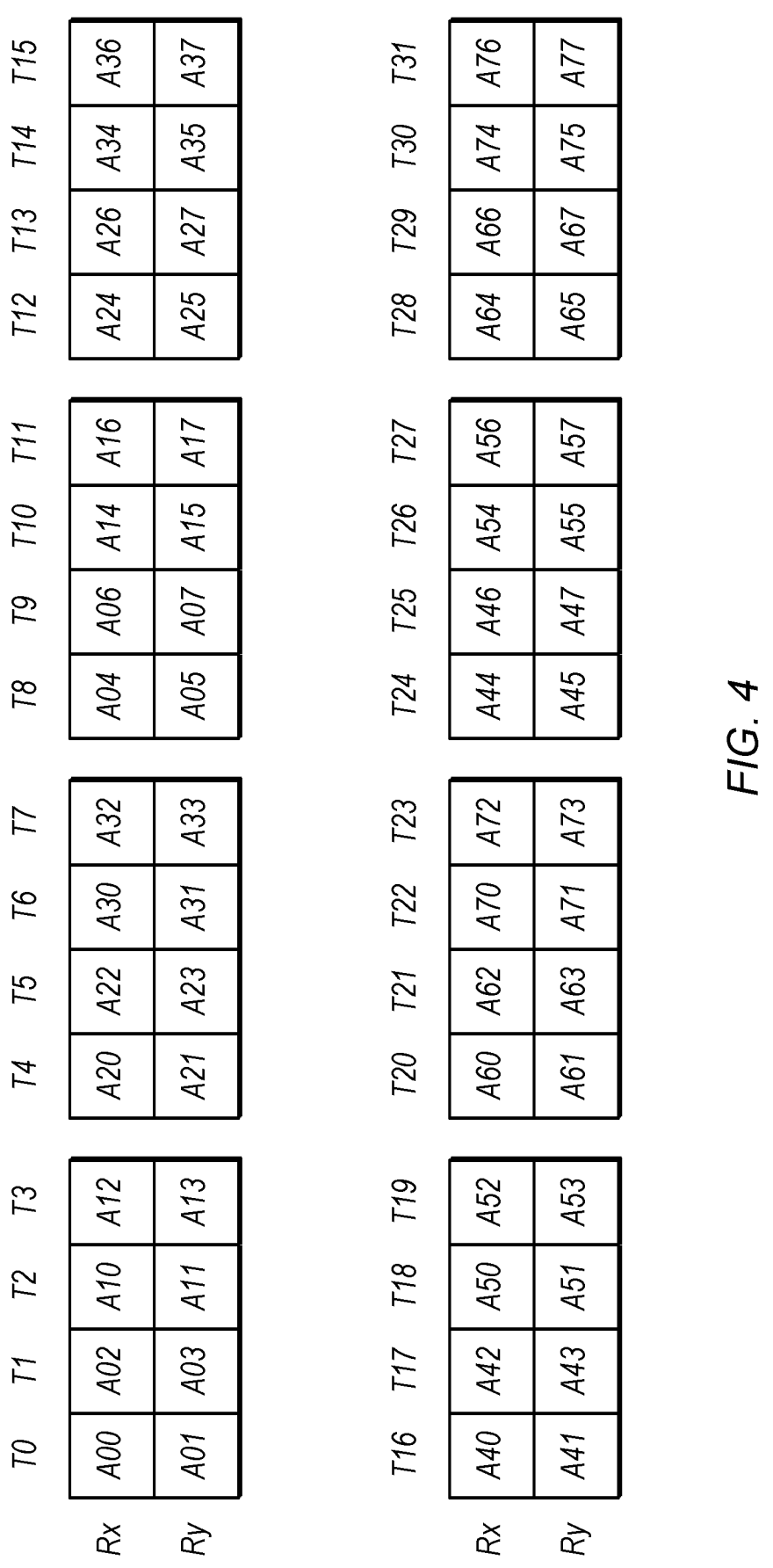

FIG. 4 is a diagram illustrating example storage of an 8×8 matrix A across thirty-two threads in a SIMD group, according to some embodiments. Note that SIMD groups of various sizes may be used herein and the number of registers used to store a given data structure size may be related to the number of threads in a SIMD group. In the illustrated example, two registers Rx and Ry are used to store matrix A. For example, the thread-specific instance of register Rx for thread T0 stores entry A00 while the thread-specific instance of register Ry for thread T9 stores entry A07. In some embodiments, additional registers may be used to store other input data structures, e.g., another matrix B to be multiplied by matrix A. For the example of FIG. 5, discussed in detail below, assume that the entries of the B matrix are distributed among threads T0 through T31 similarly to the A matrix shown in FIG. 4. An output matrix generated by the multiplication may also be similarly stored across thread-specific storage. In some embodiments, a given register may store multiple matrix entries. For example, for 16-bit matrix entries and 32-bit registers, different entries may be stored in upper and lower portions of each register.

FIGS. 5A-5D are diagrams illustrating example multiplication operations performed by different threads for an overall matrix multiplication operation of a matrix A by a matrix B. Note that various operations may also include an add operation using an operand from matrix C, which is not explicitly shown and may not use routing of operands among pipelines. In the illustrated example, the A and B operands are routed to the proper lane for the final result of a given element should reside, which allows an FMA result of a micro-operation to be cycled back to the source C of the next micro-operation to complete the overall operation. In other embodiments, a third set of routing circuitry may be implemented to route C operands.

The A and B entries shown in each block of the diagrams indicate the entries of the corresponding matrices being multiplied by that lane in that cycle. In some embodiments, FIGS. 5A-5D correspond to the following microcode, where high and low portions of R13 corresponds to Rx and Ry of FIG. 4, R12 similarly stores the B matrix, R8 stores a matrix C to be added (e.g., for the operation A*B+C) and R15 is used to store the result. The "f16fma" operation is a 16-bit fused multiply-add that uses the format "f16fma destination, S0, S1, S2" and indicates the operation: destination=S0*S1+S2.

f16fma tmp0.16, R12L, R13L, R8L.x
f16fma tmp1.16, R12L, R13H, R8H.x
f16fma tmp0.16, R12H, R13L, tmp0.16
f16fma tmp1.16, R12H, R13H, tmp1.16
f16fma tmp0.16, R12L, R13L, tmp0.16
f16fma tmp1.16, R12L, R13H, tmp1.16
f16fma tmp0.16, R12H, R13L, tmp0.16
f16fma tmp1.16, R12H, R13H, tmp1.16
f16fma tmp0.16, R12L, R13L, tmp0.16
f16fma tmp1.16, R12L, R13H, tmp1.16
f16fma tmp0.16, R12H, R13L, tmp0.16
f16fma tmp1.16, R12H, R13H, tmp1.16
f16fma tmp0.16, R12L, R13L, tmp0.16
f16fma tmp1.16, R12L.x, R13H, tmp1.16
f16fma R15L.x, R12H, R13L.x, tmp0.16
f16fma R15H.x, R12H.x, R13Hx, tmp1.16

These micro-operations may be generated based on a single matrix multiplication instruction of an instruction set architecture (ISA). Note that the "H" notation refers to the upper portion of a thirty-two bit register while the notation refers to the lower part of a thirty-two bit register. The "tmp" registers may be assigned to architectural registers or a dedicated temporary storage element and the "0.16" notation indicates that the result is in an IEEE half precision format. Further, the ".x" notation may be used to copy hint information such as "cache" or "last-use" labels for source operands in the overall matrix multiply instruction into one or more micro-operations in the corresponding generated sequence. The micro-operations above may specify the following arithmetic operations.

tmp0.16=R12L*R13L+tmp0.16
tmp1.16=R12L*R13H+tmp1.16
tmp0.16=R12H*R13H+tmp0.16
tmp1.16=R12H*R13H+tmp1.16
tmp0.16=R12L*R13L+tmp0.16
tmp1.16=R12L*R13H+tmp1.16
tmp0.16=R12H*R13L+tmp0.16
tmp1.16=R12H*R13H+tmp1.16
tmp0.16=R12L*R13L+tmp0.16
tmp1.16=R12L*R13H+tmp1.16
tmp0.16=R12H*R13L+tmp0.16
tmp1.16=R12H*R13H+tmp1.16
tmp0.16=R12L*R13L+tmp0.16
tmp1.16=R12L*R13H+tmp1.16
R 15L=R12H*R13H+tmp0.16
R 15H=R12H*R13L+tmp1.16

In some embodiments, control information (not explicitly shown in the instructions above) for these operations specifies routing of operands by routing circuitry 210 and 220 such that some of the input operands S0 and S1 (e.g., in registers R12 and R13) are actually received from other threads. This routing is reflected in the input operands for various operations shown in FIGS. 5A and 5B. In particular, any input operations that are not stored in a particular lane (e.g., in the arrangement of input data structures of FIG. 4) are routed from other lanes using routing circuitry 210 or 220.

In FIG. 5A, for example, thread T0 in lane 0 multiplies entry A00 by entry B00 in cycle 0, which does not require routing because both of these entries are stored in thread-specific storage for lane 0 in the arrangement of FIG. 4. At cycle 4, however, thread T0 multiplies entry A02 by entry B20, where A02 is stored in thread T1's storage and B20 is stored in thread T6's storage. Therefore, routing circuitry 210 may route the B20 data to thread T0 and routing circuitry 220 may route the A02 data to thread T0 for this multiplication operation. As another routing example, lane 2 uses operands A14 and B40 at cycle 8, which are routed from lanes 10 and 16 respectively.

As discussed above, second routing circuitry 220 may route the thread assigned to lane X+1, the thread assigned to lane X+8, and the thread assigned to lane X+9. Thus, in the illustrated example, routing circuitry 220 may be configured to provide S1 operands to thread T0 from threads T1, T8, and T9. Similarly, routing circuitry 220 may be configured to provide S1 operands to thread T1 from threads T2, T9, and T10, to thread T2 from threads T3, T10, and T11, and so on.

Figure 5D:
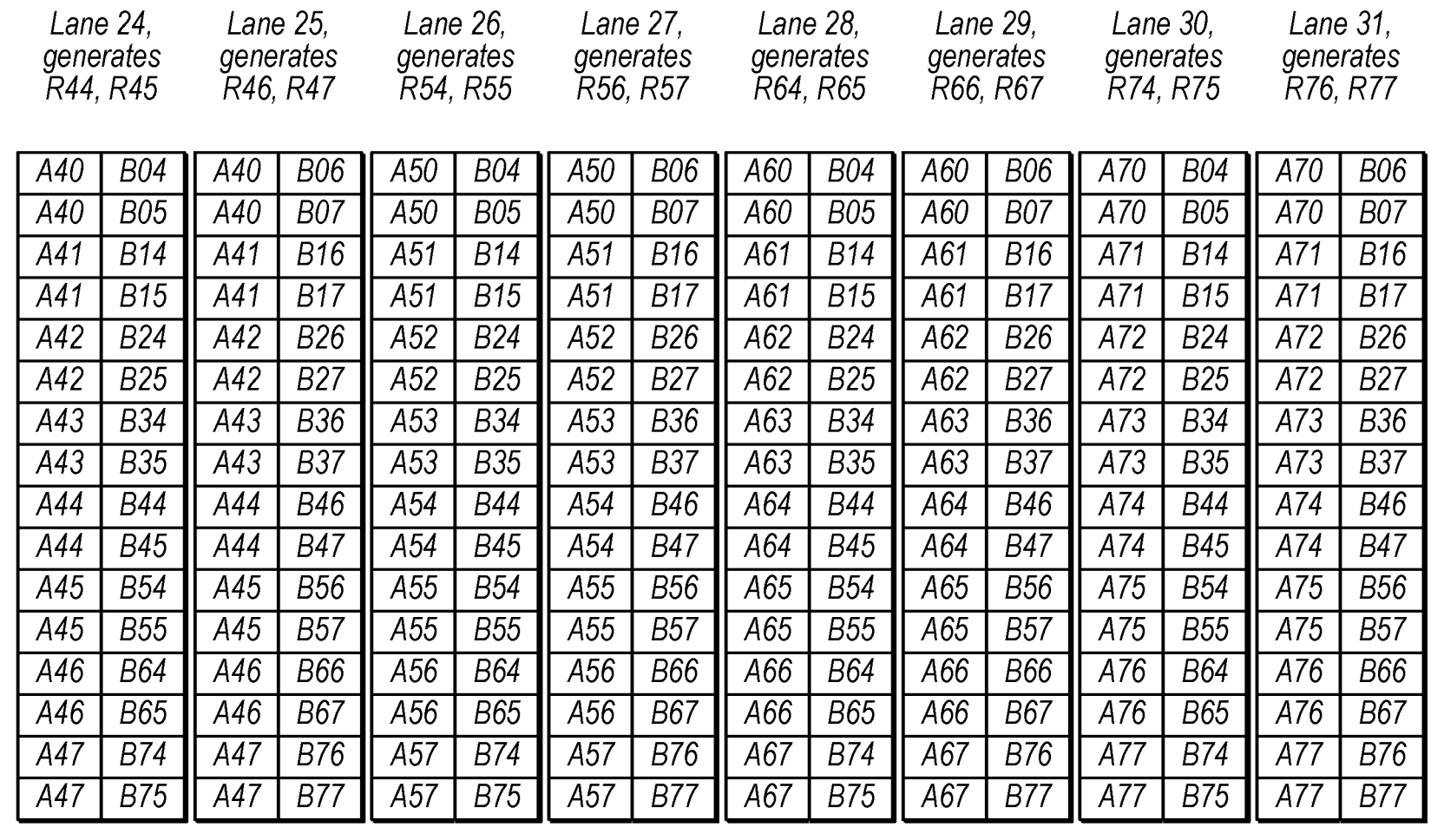

FIGS. 5B-5D are similar to FIG. 5A and show operations for the remaining threads of a thirty-two thread example SIMD group. Completion of the specified multiplication operations on the entries of the A and B matrices may accomplish an 8×8 matrix multiplication of these two matrices. Upon completion of the operations, the output data structure R is stored in one or more architectural registers across thread-specific storage for the SIMD group. The portions of the R data structure generated by each lane are indicated in FIGS. 5A-5D (e.g., lane 0 stores R00 and R01, and so on).

As discussed above, each multiplication shown in FIGS. 5A-5D may also have a corresponding add operation from the C matrix. In some embodiments, however, this does not require routing between threads for data from the C matrix. In some embodiments, staging circuitry 240 is configured to store S0 operands for re-use in a next cycle for some of the operations of FIGS. 5A-5D. In some embodiments, rename circuitry may be implemented to avoid write after read (WAR) hazards when source and destination registers overlap in the generated micro-operations.

Note that, while the disclosed techniques may be used to perform the maximum size of matrix multiplication for a given SIMD group size, these techniques may also be used to perform multiple smaller matrix multiplications in parallel using a given SIMD group (e.g., multiple 4×4 matrix multiplications instead of one 8×8 matrix multiplication).

Example Reduction Operations

In some embodiments, the disclosed operand routing techniques are used to perform reduce instructions at one or more granularities. For example, a device may support reduce instructions for threads within a quad or within a SIMD group. Further, a device may support both prefix and total reduction operations. For prefix reductions, each thread may store a result of a specified operations performed on operands from threads up to the index of that thread. For example, if the operation is an add, thread 7 may store the sum of operands from threads 0 through 7. For total reductions, all threads may receive the same result, which may also be generated based on a specified operation. Similar operations may be performed within a threads in a quad or other granularity within a SIMD group.

Figure 6A:
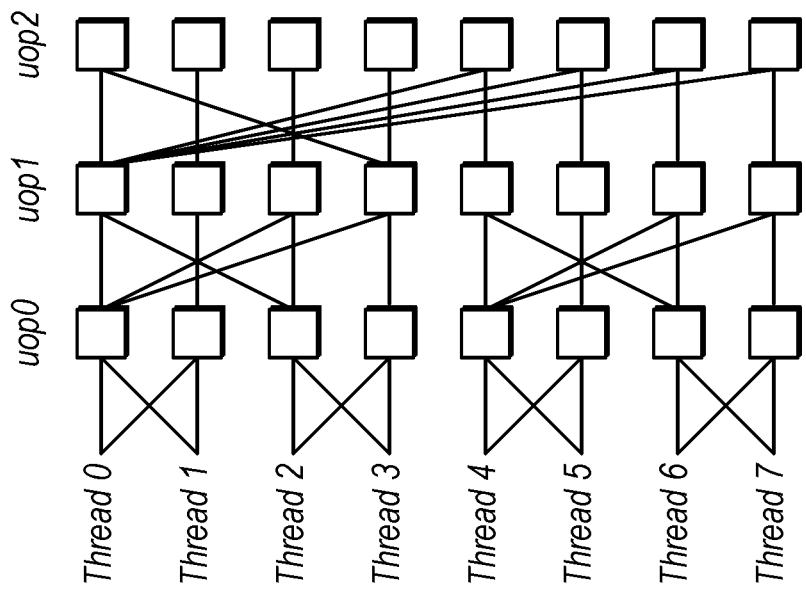
FIG. 6A is a diagram illustrating example data movement for a prefix reduction operation, according to some embodiments.

FIG. 6A is a diagram illustrating example data movement for eight threads for a SIMD prefix reduce operation, according to some embodiments. In the illustrated example, each column corresponds to a micro-operation, e.g., using a trip through the pipeline of FIG. 2. Thus, execution each micro-operation may include routing and an arithmetic operation such as a fused multiply-add. In the illustrated embodiment, each thread receives an operand from one other thread for uop0, threads 0, 2-3, 4, and 6-7 each receive an operand from one other thread for uop1, and threads 0 and 4-7 each receive an operand from one other thread for uop1. The disclosed data movement techniques may be expanded to any appropriate SIMD group size, in various embodiments. Note that some of the nodes of FIGS. 6A-6B may not involve routing, e.g., if they receive only one input operand. Further, some threads may perform no-ops or may be disabled, e.g., once their reduction result values have been determined and stored. For example, thread 1 may store its reduction result after up0 in the example of FIG. 6A.

Figure 6B:
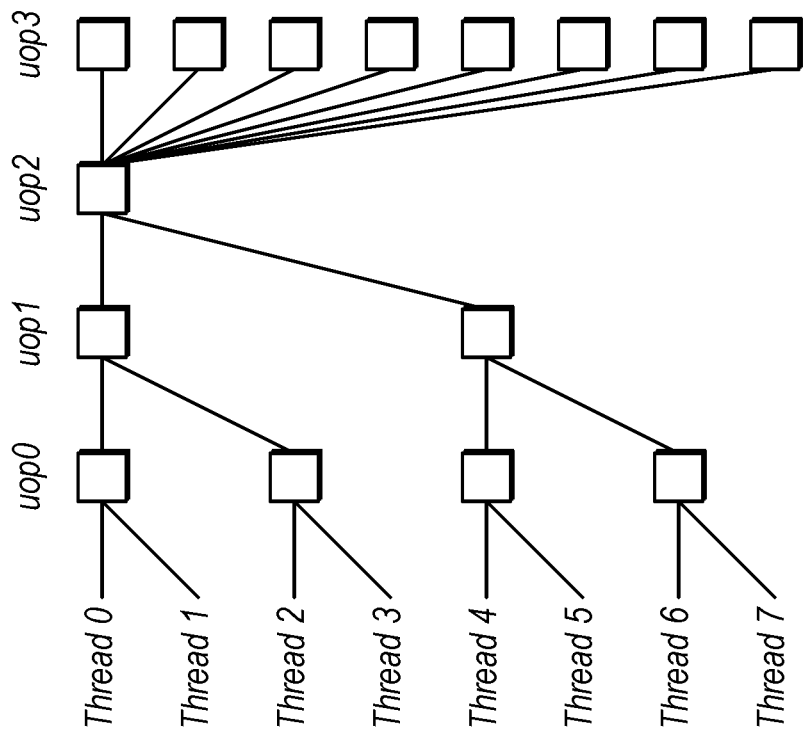
FIG. 6B is a diagram illustrating example data movement for a total reduction operation, according to some embodiments.

FIG. 6B is a diagram illustrating example data movement for eight threads for a SIMD total reduce operation, according to some embodiments. In the illustrated example, each column corresponds to execution of a micro-operation, e.g., using a trip through the pipeline of FIG. 2. As shown, certain threads receive operands from another thread for each micro-operation (uop0 through uop3) and thread 0 broadcasts the result to all threads for uop3. Note that various operations may be performed at each node, e.g., a fused multiply-add operation or some other operation.

In some embodiments, the device may turn off threads (e.g., using predication) to reduce power during the one or more types of reduction operations. In some embodiments, reduce instructions are expected to run on all threads, whether they are executed or not (e.g., even if they are predicated off). In these embodiments, pipelines may be configured to provide identity value (e.g., add zero) in certain situations so that data can flow through non-executing threads to enter a new thread.

Example Method

FIG. 7 is a flow diagram illustrating an example method for processing input data structures stored across thread-specific storage for multiple threads, according to some embodiments. The method shown in FIG. 7 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 710, in the illustrated embodiment, a computing device performs a mathematical operation on source input data structures stored across thread-specific storage for a set of hardware pipelines, by executing multiple SIMD floating-point operations. In the illustrated embodiment, this includes performing elements 720 and 730 for multiple SIMD instructions.

At 720, in the illustrated embodiment, execution circuitry performs floating-point operations using one or more pipeline stages of one of the pipelines.

At 730, in the illustrated embodiment, routing circuitry selects, from among thread-specific operands stored for the hardware pipeline and from one or more other pipelines in the set, a first input operand for an operation by the execution circuitry.

Example Hierarchical Routing Circuitry

Figure 8A:
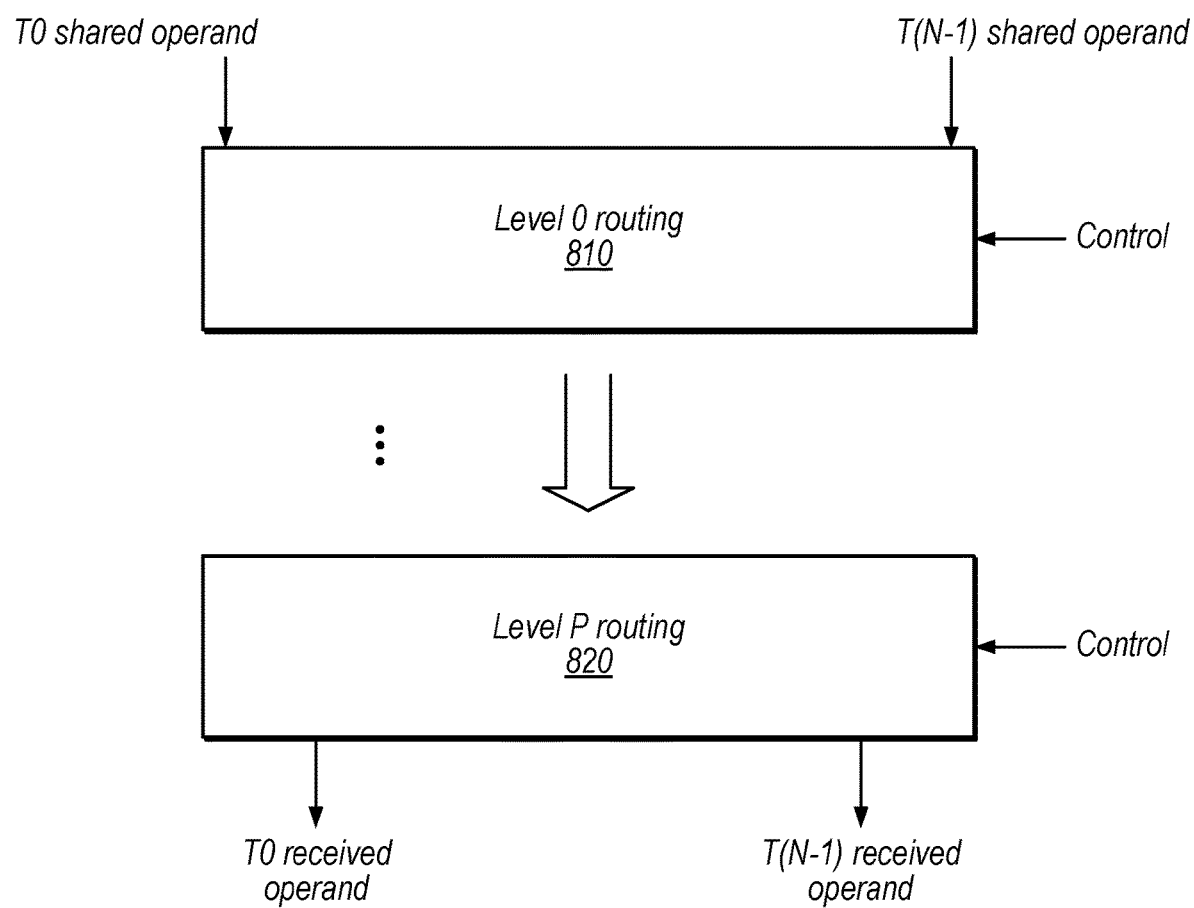
FIGS. 8A-8B are block diagrams illustrating example hierarchical routing circuits, according to some embodiments.
Figure 8B:
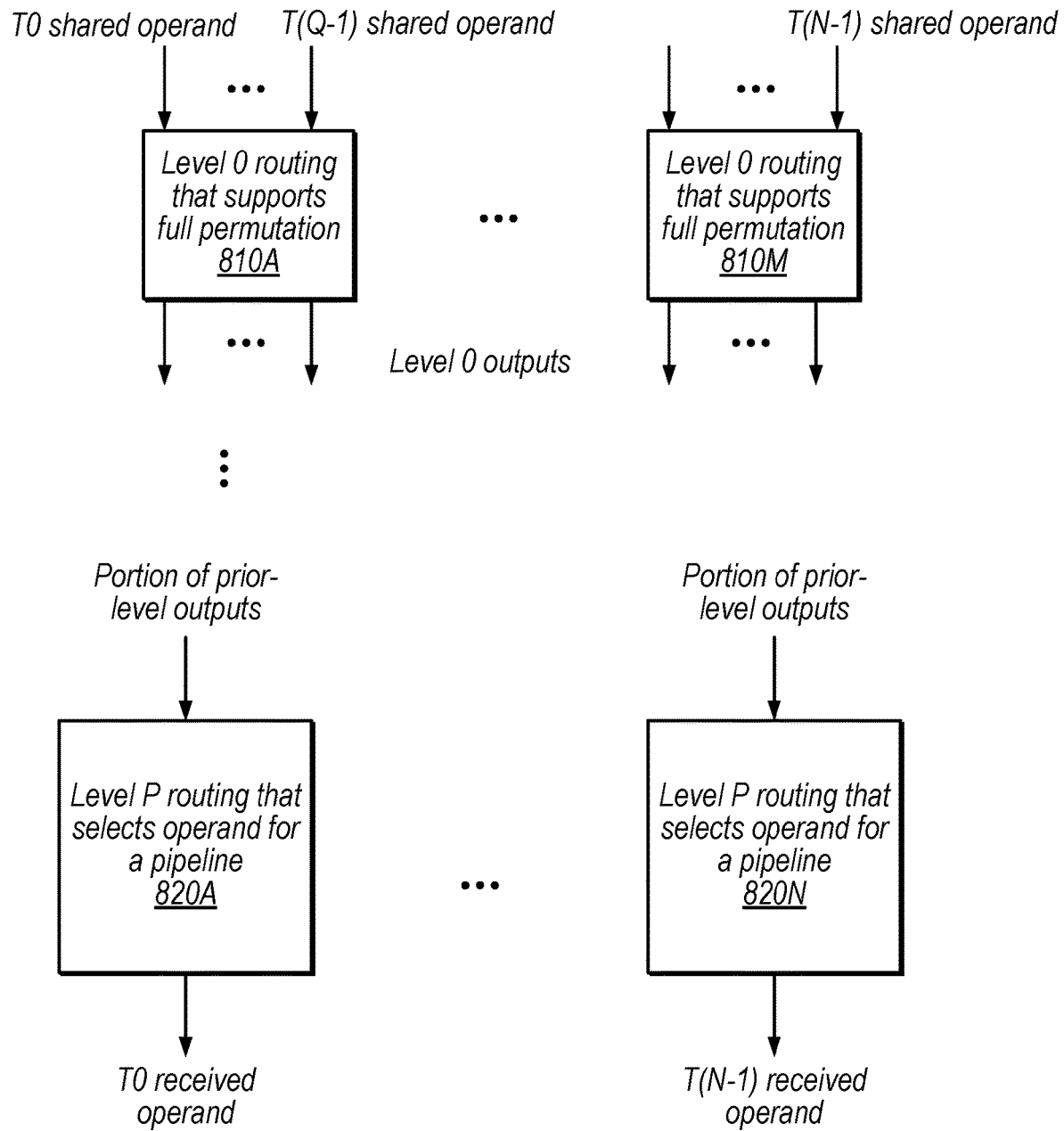
Figure 9:
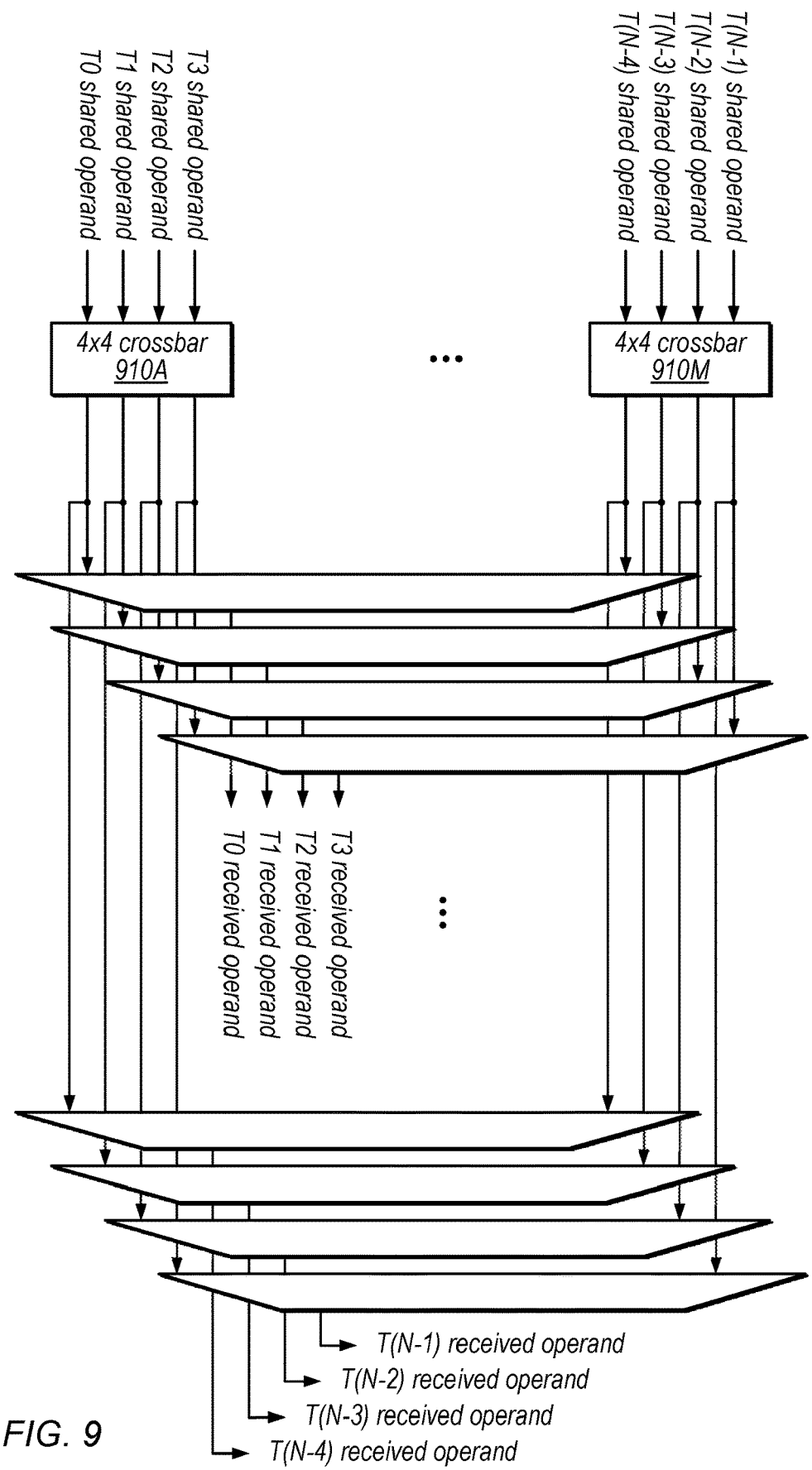
FIG. 9 is a diagram illustrating a more detailed example of a two-level routing circuit, according to some embodiments.

FIGS. 8A, 8B, and 9 are described below and provide examples of hierarchical routing circuitry that may be used for various routing operations discussed above. In some embodiments, first routing circuitry 210 is hierarchical and supports a subset of a full set of permutations of inputs while second routing circuitry 220 is implemented using a multiplexer.

FIG. 8A is a block diagram illustrating example hierarchical routing circuitry, according to some embodiments. As shown, the routing circuitry may include any appropriate number of levels, including as few as two levels. In the illustrated example, the routing circuitry receives operands to be shared from N threads T0 through T(N−1) and outputs received operands for each of these threads.

In the illustrated embodiment, the routing circuitry includes P levels of routing circuitry, including level 0 810 and level P 820, which each receive respective control signals (e.g., based on the instruction being executed). In various embodiments, operands enter an input level of the routing circuitry and exit a final level of the routing circuitry. As used herein, a "prior" level of the routing circuitry refers to a level that is closer to the input level. For example, level 0 is the input level and is thus prior to level P in the illustrated embodiment. The level P routing elements 820, in the illustrated embodiment, output received operands for the N SIMD threads.

The routing circuitry of FIG. 8A may not support full permutations of inputs. One or more levels, however, may implement a full permutation within respective subsets of their input operands.

FIG. 8B is a block diagram illustrating multi-level routing circuitry that includes a level that supports full permutation among subsets of inputs and a selection level that selects outputs, according to some embodiments. FIG. 8B is one example of the circuitry of FIG. 8A. In the illustrated example, the level 0 routing circuitry 810 includes multiple elements 810A-810M that each support full permutation among a subset of the inputs to level 0. For example, circuit element 810A supports full permutation among threads T0 through T(Q−1). Note that, although shown as the input level in this example, a level that supports full permutation among subsets of inputs may be included at any appropriate level, in other embodiments. In some embodiments, each circuit element 810 has the same number of inputs and outputs.

The level P routing circuitry, in the illustrated example, includes a selection circuit element configured to select from a portion of the prior-level outputs (e.g., from level 0 or an intermediate level) to provide an operand for a particular thread. For example, selection element 820A receives a portion of the prior level outputs to select an operand for thread T0. As one example, elements 810 may be implemented using crossbars while elements 820 may be implemented using multiplexers, as discussed in detail below with reference to FIG. 3.

Example Two-Level Routing Circuitry

FIG. 9 is a block diagram illustrating a specific example of two-level routing circuitry, according to some embodiments. In the illustrated embodiment, routing circuitry includes 4×4 crossbars 910A-910M and a multiplexer for each of the N threads. Similarly to FIGS. 8A and 8B, the illustrated routing circuitry is configured to receive operands for N threads and output operands for the N threads according to a specified permutation in a set of supported permutations.

Crossbar circuits 910, in the illustrated embodiment, are each configured to receive operands from a respective subset of pipelines to which a portion of the threads in a SIMD group are assigned and output the received operands based on a specified permute operation. In some embodiments, the crossbars 910 each support full permutation within their respective subset of operands. In some embodiments, the threads input to a given 4×4 crossbar are four threads that process a 2×2 quad of pixels. This may allow full permutation among operands for a given quad, in various embodiments. Note that in other embodiments, full crossbars may be configured to receive operands for subsets of threads with any of various numbers of threads, such as 8, 16, 32, etc.

The multiplexers, in the illustrated embodiment, are each configured to receive a particular output from all of the crossbars and select one of the crossbars to provide operands for their subset of the threads. For example, the multiplexer configured to select a received operand for thread T0 receives the left-most output from each of the M crossbars 910. Similarly, the multiplexer configured to select a received operand for thread T1 receives the second-to-the-left-most output from each of the M crossbars 910, and so on. Thus, each multiplexer receives only a portion of the outputs from the crossbar level of the routing circuitry (one output from each crossbar, in this example) and selects one of the outputs for its corresponding thread. Note that the multiplexers may be separately controlled based on the permutation operation being performed (control signals not explicitly shown).

For an example with a 16-thread SIMD group size, four 4×4 crossbars may be implemented and each of 16 multiplexers may receive four inputs. For an example with a 32-thread SIMD group size, eight 4×4 crossbars may be implemented and each of 32 multiplexers may receive eight inputs. For an example with a 64-thread group size, sixteen 4×4 crossbars may be implemented and each of 64 multiplexers may receive sixteen inputs. Note that the number of inputs per multiplexer may vary based on the size of the crossbars 910 as well, in some embodiments. Further, in some embodiments, later levels may receive subsets of operands from prior levels, where the subsets have any appropriate size. For example, in the example of FIG. 9, each MUX may receive two or more operands from each crossbar, which may increase circuit area relative to the illustrated example but may also increase the number of supported permutations in one pass through the routing circuitry. For at least certain SIMD group sizes, the routing circuitry of FIG. 9 supports full permutation within at most four passes through the routing circuitry. More generally, in some embodiments, the disclosed routing circuitry is configured to perform an arbitrary SIMD-wide shuffle in as many cycles as the number N of inputs to each element of the first level of the routing circuitry, e.g., by iterating across each numbered input to a given element at the first level over N cycles and then selecting the desired output value for a thread when it becomes available.

In some embodiments, the disclosed routing circuitry supports various permute operations using one pass through the routing circuitry (which may be performed in a single cycle). Examples of such operations include shift, rotate, broadcast, or butterfly operations. Shift operations may shift operands by a specified number of threads and may shift in a specified value such as zero or one into vacated threads. In some embodiments, uniform shift amounts among the threads may be expected. Rotate operations may similarly shift a specified number of threads but may wrap around values from other threads of the SIMD group. Broadcast operations may send an operand from one thread to multiple (or all) other threads in a SIMD group. Butterfly operations may mirror all or a portion of a SIMD group.

In some embodiments, the circuitry of FIG. 9 supports the permutations used for the techniques of FIGS. 5A-6B.

Example Device

Figure 10:
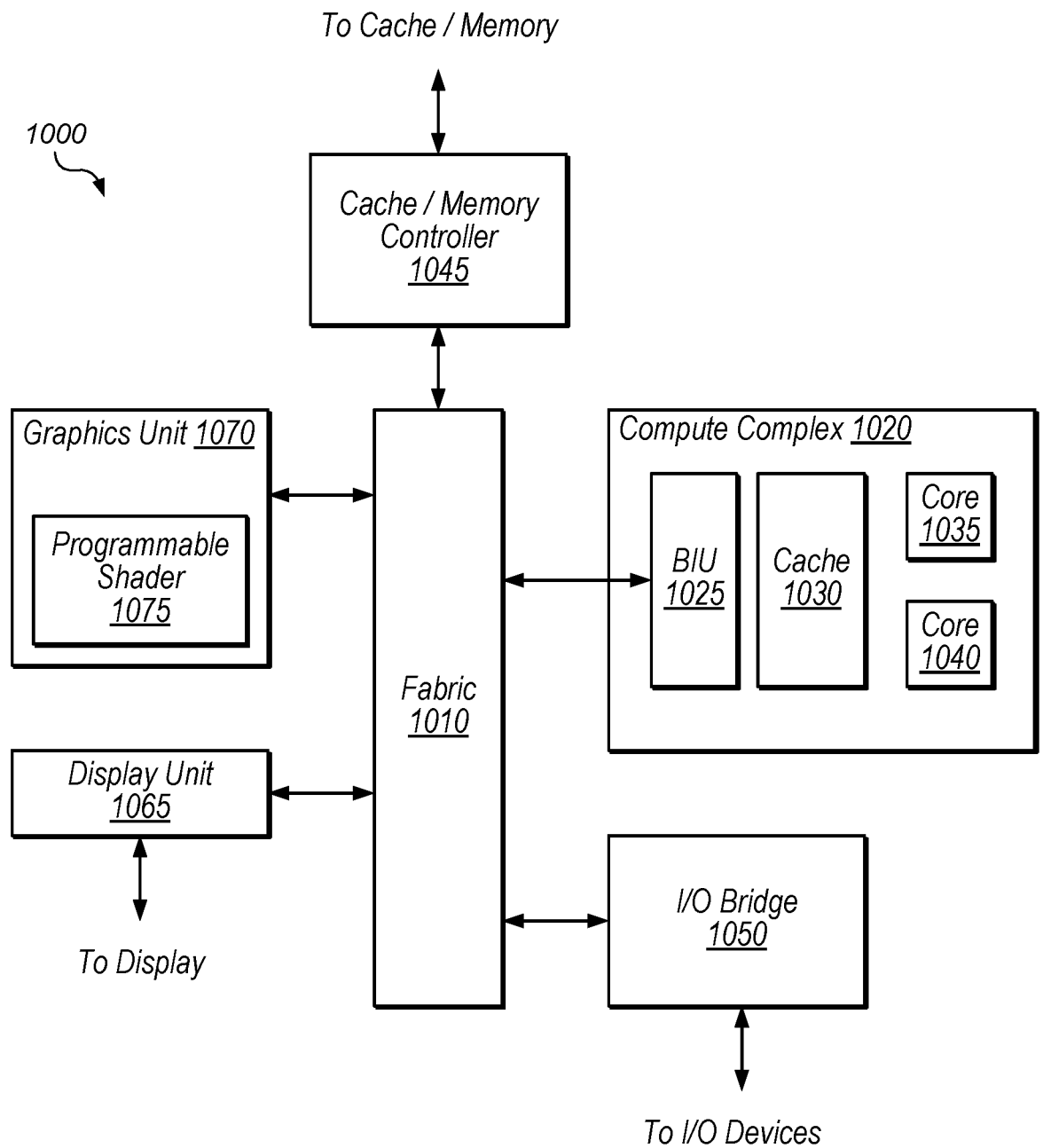
FIG. 10 is a block diagram illustrating an example computing device that may include SIMD pipelines, according to some embodiments.

Referring now to FIG. 10, a block diagram illustrating an example embodiment of a device 1000 is shown. In some embodiments, elements of device 1000 may be included within a system on a chip. In some embodiments, device 1000 may be included in a mobile device, which may be battery-powered. Therefore, power consumption by device 1000 may be an important design consideration. In the illustrated embodiment, device 1000 includes fabric 1010, compute complex 1020 input/output (I/O) bridge 1050, cache/memory controller 1045, graphics unit 1070, and display unit 1065. In some embodiments, device 1000 may include other components (not shown) in addition to and/or in place of the illustrated components, such as video processor encoders and decoders, image processing or recognition elements, computer vision elements, etc.

Fabric 1010 may include various interconnects, buses, MUX's, controllers, etc., and may be configured to facilitate communication between various elements of device 1000. In some embodiments, portions of fabric 1010 may be configured to implement various different communication protocols. In other embodiments, fabric 1010 may implement a single communication protocol and elements coupled to fabric 1010 may convert from the single communication protocol to other communication protocols internally.

In the illustrated embodiment, compute complex 1020 includes bus interface unit (BIU) 1025, cache 1030, and cores 1035 and 1040. In various embodiments, compute complex 1020 may include various numbers of processors, processor cores and/or caches. For example, compute complex 1020 may include 1, 2, or 4 processor cores, or any other suitable number. In one embodiment, cache 1030 is a set associative L2 cache. In some embodiments, cores 1035 and/or 1040 may include internal instruction and/or data caches. In some embodiments, a coherency unit (not shown) in fabric 1010, cache 1030, or elsewhere in device 1000 may be configured to maintain coherency between various caches of device 1000. BIU 1025 may be configured to manage communication between compute complex 1020 and other elements of device 1000. Processor cores such as cores 1035 and 1040 may be configured to execute instructions of a particular instruction set architecture (ISA) which may include operating system instructions and user application instructions.

Cache/memory controller 1045 may be configured to manage transfer of data between fabric 1010 and one or more caches and/or memories. For example, cache/memory controller 1045 may be coupled to an L3 cache, which may in turn be coupled to a system memory. In other embodiments, cache/memory controller 1045 may be directly coupled to a memory. In some embodiments, cache/memory controller 1045 may include one or more internal caches.

As used herein, the term "coupled to" may indicate one or more connections between elements, and a coupling may include intervening elements. For example, in FIG. 10, graphics unit 1070 may be described as "coupled to" a memory through fabric 1010 and cache/memory controller 1045. In contrast, in the illustrated embodiment of FIG. 10, graphics unit 1070 is "directly coupled" to fabric 1010 because there are no intervening elements.

Graphics unit 1070 may include one or more processors and/or one or more graphics processing units (GPU's). Graphics unit 1070 may receive graphics-oriented instructions, such as OPENGL®, Metal, or DIRECT3D® instructions, for example. Graphics unit 1070 may execute specialized GPU instructions or perform other operations based on the received graphics-oriented instructions. Graphics unit 1070 may generally be configured to process large blocks of data in parallel and may build images in a frame buffer for output to a display. Graphics unit 1070 may include transform, lighting, triangle, and/or rendering engines in one or more graphics processing pipelines. Graphics unit 1070 may output pixel information for display images. Programmable shader 1075, in various embodiments, may include highly parallel execution cores configured to execute graphics programs, which may include pixel tasks, vertex tasks, and compute tasks (which may or may not be graphics-related).

In some embodiments, programmable shader 1075 includes the disclosed datapath and routing circuitry. Programmable shader 1075 may include multiple copies of the disclosed circuitry, e.g., for different sets of pipelines configured to process different SIMD groups. In other embodiments, the disclosed routing circuitry may be used in various other contexts, e.g., within a CPU core, a display unit, etc.

Display unit 1065 may be configured to read data from a frame buffer and provide a stream of pixel values for display. Display unit 1065 may be configured as a display pipeline in some embodiments. Additionally, display unit 1065 may be configured to blend multiple frames to produce an output frame. Further, display unit 1065 may include one or more interfaces (e.g., MIPI® or embedded display port (eDP)) for coupling to a user display (e.g., a touchscreen or an external display).

I/O bridge 1050 may include various elements configured to implement: universal serial bus (USB) communications, security, audio, and/or low-power always-on functionality, for example. I/O bridge 1050 may also include interfaces such as pulse-width modulation (PWM), general-purpose input/output (GPIO), serial peripheral interface (SPI), and/or inter-integrated circuit (I2C), for example. Various types of peripherals and devices may be coupled to device 1000 via I/O bridge 1050.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 11:
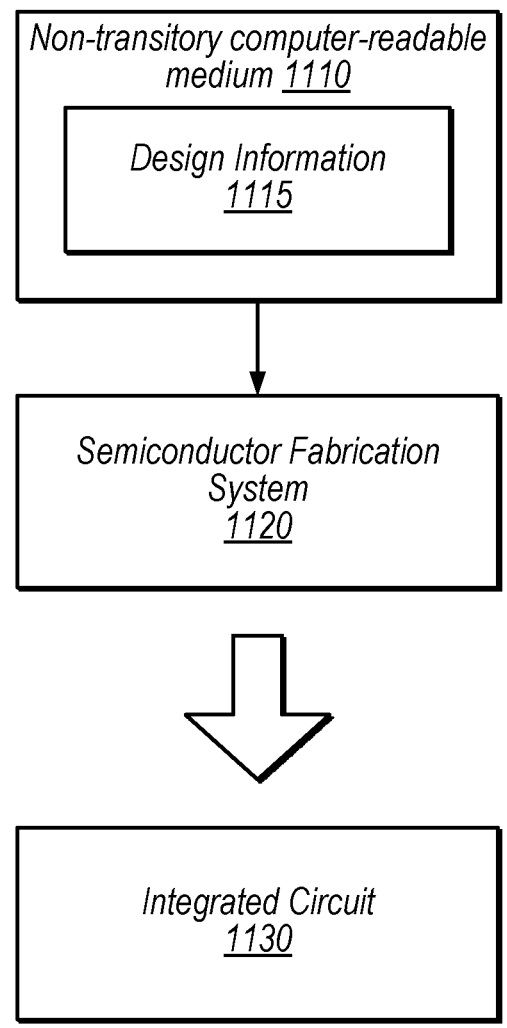
FIG. 11 is a block diagram illustrating an example computer-readable medium that stores circuit design information, according to some embodiments.

FIG. 11 is a block diagram illustrating an example non-transitory computer-readable storage medium that stores circuit design information, according to some embodiments. In the illustrated embodiment semiconductor fabrication system 1120 is configured to process the design information 1115 stored on non-transitory computer-readable medium 1110 and fabricate integrated circuit 1130 based on the design information 1115.

Non-transitory computer-readable storage medium 1110, may comprise any of various appropriate types of memory devices or storage devices. Non-transitory computer-readable storage medium 1110 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system 1120. In some embodiments, design information 1115 may also include one or more cell libraries which specify the synthesis and/or layout of integrated circuit 1130. In some embodiments, the design information is specified in whole or in part in the form of a netlist that specifies cell library elements and their connectivity. Design information 1115, taken alone, may or may not include sufficient information for fabrication of a corresponding integrated circuit. For example, design information 1115 may specify the circuit elements to be fabricated but not their physical layout. In this case, design information 1115 may need to be combined with layout information to actually fabricate the specified circuitry.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown in FIG. 1A, 2, or 8A-10. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a set of multiple hardware pipelines configured to execute single-instruction multiple-data (SIMD) instructions for multiple threads in parallel, wherein ones of the hardware pipelines include:
  operand read circuitry configured to access thread-specific storage for a corresponding thread, wherein the thread-specific storage is not accessible to operand read circuitry assigned to other threads in a SIMD group;
  execution circuitry configured to perform floating-point operations using one or more pipeline stages of the pipeline; and
  first routing circuitry configured to select, from among thread-specific operands stored for the hardware pipeline and from one or more other pipelines in the set, a first input operand for an operation by the execution circuitry;
 wherein the apparatus is configured to perform a mathematical operation on source input data structures stored across thread-specific storage for the set of hardware pipelines, by executing multiple SIMD floating-point operations using the execution circuitry and the first routing circuitry.

2. The apparatus of claim 1, wherein the source input data structures are matrices and the mathematical operation is a matrix multiply operation.

3. The apparatus of claim 1, wherein each the hardware pipelines in the set of hardware pipelines further include:
 second routing circuitry configured to select, from among thread-specific operands stored for the hardware pipeline from an integer number N of other pipelines in the set, a second input operand for the operation by the execution circuitry;
 wherein the first routing circuitry is configured to select from among thread-specific operands from an integer number M of other pipelines in the set of hardware pipelines, wherein the value of M is greater than the value of N.

4. The apparatus of claim 3,
wherein the first and second routing circuitry is included in one or more pipeline stages between the operand read circuitry and the execution circuitry.

5. The apparatus of claim 1, wherein the mathematical operation is a SIMD reduce operation.

6. The apparatus of claim 1, wherein the first routing circuitry is configured to select from among thread-specific operands from at least seven other pipelines.

7. The apparatus of claim 1, wherein the multiple SIMD floating-point operations are fused multiply-add instructions.

8. The apparatus of claim 1, wherein the thread-specific operands are stored in a register file.

9. The apparatus of claim 1, further comprising staging circuitry configured to provide an output of the first routing circuitry as an input to the first routing circuitry in a subsequent clock cycle.

10. The apparatus of claim 1, wherein the apparatus is a graphics processor configured to process instructions using the set of multiple hardware pipelines to generate frames of graphics data.

11. A method, comprising:
performing, by a computing device, a mathematical operation on source input data structures stored across thread-specific storage for a set of hardware pipelines, by executing multiple SIMD floating-point operations, including, for multiple SIMD instructions:
performing, by execution circuitry, floating-point operations using one or more pipeline stages of one of the pipelines; and
selecting, by routing circuitry, from among thread-specific operands stored for the hardware pipeline and from one or more other pipelines in the set, a first input operand for an operation by the execution circuitry, wherein the thread-specific operands are accessible to operand read circuitry for a corresponding thread but are not accessible to operand read circuitry assigned to other threads in a SIMD group.

12. The method of claim 11, wherein the source input data structures are matrices and the mathematical operation is a matrix multiply operation.

13. The method of claim 11, wherein the operations further comprise, for one or more of the multiple SIMD instructions:
selecting, by routing circuitry, from among thread-specific operands stored for the hardware pipeline and from one or more other pipelines in the set, a second input operand for the operation by the execution circuitry.

14. The method of claim 11, wherein the selecting is performed from among operands from at least seven other pipelines.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a set of multiple hardware pipelines configured to execute single-instruction multiple-data (SIMD) instructions for multiple threads in parallel, wherein ones of the hardware pipelines include:
operand read circuitry configured to access thread-specific storage for a corresponding thread, wherein the thread-specific storage is not accessible to operand read circuitry assigned to other threads in a SIMD group;
execution circuitry configured to perform floating-point operations using one or more pipeline stages of the pipeline; and
first routing circuitry configured to select, from among thread-specific operands stored for the hardware pipeline and from one or more other pipelines in the set, a first input operand for an operation by the execution circuitry;
wherein the circuit is configured to perform a mathematical operation on source input data structures stored across thread-specific storage for the set of hardware pipelines, by executing multiple SIMD floating-point operations using the execution circuitry and the first routing circuitry.

16. The non-transitory computer readable storage medium of claim 15, wherein the source input data structures are matrices and the mathematical operation is a matrix multiply operation.

17. The non-transitory computer readable storage medium of claim 15, wherein the ones of the hardware pipelines further include:
second routing circuitry configured to select, from among thread-specific operands stored for the hardware pipeline and from one or more other pipelines in the set, a second input operand for the operation by the execution circuitry.

18. The non-transitory computer readable storage medium of claim 17, wherein the second routing circuitry is configured to select from among thread-specific operands from a subset of pipelines that is smaller in number than a set of pipelines configured to provide thread-specific operands to the first routing circuitry.

19. The non-transitory computer readable storage medium of claim 15, wherein the first routing circuitry is configured to select from among thread-specific operands from at least seven other pipelines.

20. The non-transitory computer readable storage medium of claim 15, wherein the circuit further comprises staging circuitry configured to provide an output of the first routing circuitry as an input to the first routing circuitry in a subsequent clock cycle.

* * * * *